J. B. SCHOFIELD.
Car-Starters.

No. 152,177.   Patented June 16, 1874.

WITNESSES
Geo. E. Upham.
Robert Everett,

INVENTOR
James B. Schofield
By Chipman Hosmer & Co
ATTORNEYS.

UNITED STATES PATENT OFFICE.

JAMES B. SCHOFIELD, OF CALDWELL, OHIO, ASSIGNOR OF HALF HIS RIGHT TO MARQUIS L. TILTON AND JONATHAN B. TILTON.

IMPROVEMENT IN CAR-STARTERS.

Specification forming part of Letters Patent No. 152,177, dated June 16, 1874; application filed March 21, 1874.

*To all whom it may concern:*

Be it known that I, JAMES B. SCHOFIELD, of Caldwell, in the county of Noble and State of Ohio, have invented a new and valuable Improvement in Car-Starters; and I do hereby declare that the following is a full, clear, and exact description of the construction and operation of the same, reference being had to the annexed drawings making a part of this specification, and to the letters and figures of reference marked thereon.

Figure 1:
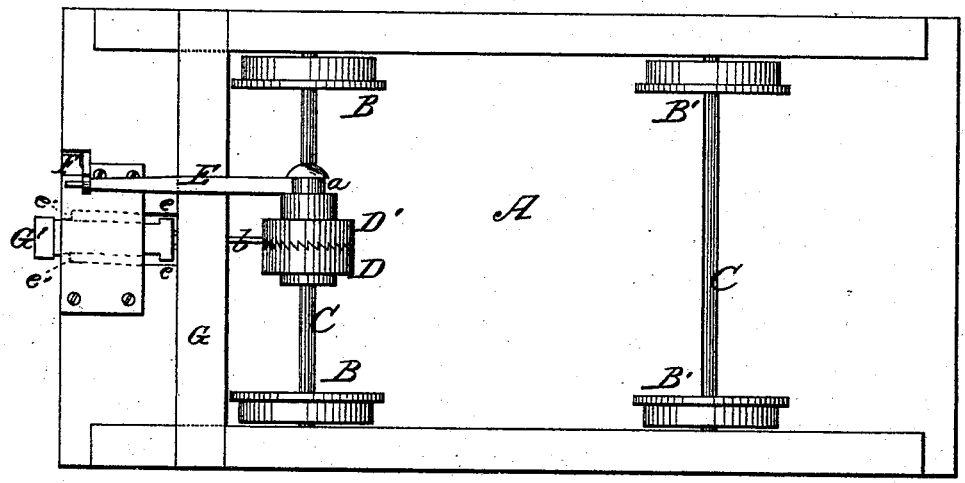
Figure 2:
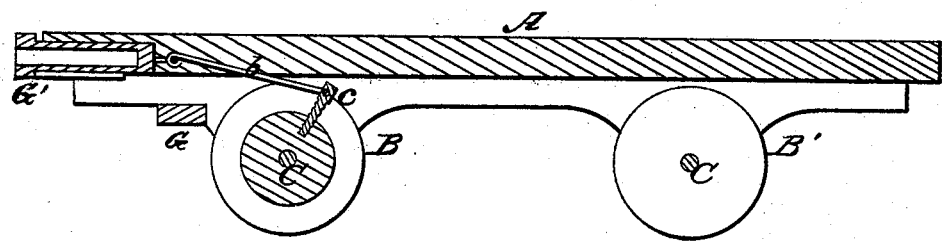
Figure 3:
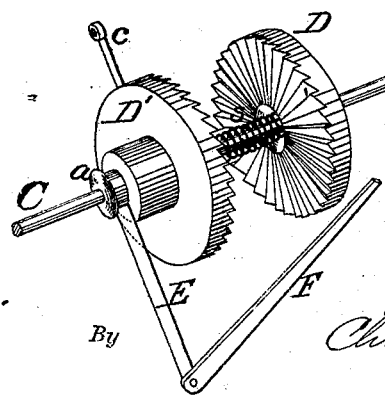

Figure 1 of the drawing is a representation of a bottom view of my car-starter, and Fig. 2 is a sectional view of the same. Fig. 3 is a detail view.

This invention has relation to means for aiding horses in starting street-cars; and it consists in a clutching device applied on the car-axle, in combination with shifting-levers therefor; and also in combination with a longitudinally movable coupling-head, which is attached by a connecting-rod and lever to that part of the said clutching device which is applied to turn loosely on the axle, thereby affording the animal drawing the car a powerful leverage, which will aid him in starting the car, as will be hereinafter explained.

In the annexed drawing, A designates a car-platform, and B B' the truck-wheels, which latter are applied on axles C C, in the usual well-known manner.

In practice, the contrivance which I shall hereinafter describe will be applied to both ends of a car, but the drawing shows such contrivance applied at one end of a car only.

D D' designate two toothed hubs, which constitute a clutching device. The toothed hub D is rigidly keyed on the axle C of the wheels B B, and the toothed hub D' is loosely applied on this axle, so that it will not only turn freely thereon when disengaged from the hub D, but it is longitudinally movable on its axle. An annular grooved portion, a, is formed on the loose hub D', which is embraced by the yoked end of a horizontally-vibrating lever, E, which lever has its fulcrum underneath of a cross-bar, G, fixed to the truck-frame. The front end of the lever E is pivoted to the lower end of a hand-lever, F. This lever F rises through the car-platform, on which it has its fulcrum, and is located in a convenient position to the driver stationed on said platform. It is by means of lever F that the driver can engage the loose portion of the clutch with that portion which is keyed on the axle C. The loose portion D' of the clutch has an arm, c, projecting radially from its periphery, to which arm a rod, b, is connected, which is also connected to the rear end of a coupling-head, G. This coupling-head is longitudinally movable, and it is constructed so that a draft-pole can be attached to it by a coupling-pin. The head G' has side flanges e e formed on it at its rear end, which limit the forward movement of this head by coming in contact with shoulders or stops e' e' when the head has been drawn out as far as desired. Between the two clutch-hubs D D' is a helical spring, s, which will be compressed in an endwise direction when these hubs are engaged with each other, and which will aid in disengaging the hub D' from the hub D, and also keep the hubs apart when the hub D' is released.

From the above description it will be seen that when the driver engages the hub D' with hub D, the car being in motion, the rotation of the axle C will move back the coupling-head G', and when the horse is started forward he will draw forward this coupling-head, and thus act on the axle to start the car through the medium of the arm C, the clutch D', and the clutch D. At the same time the car is started the clutch D' is released from the clutch D.

What I claim as new, and desire to secure by Letters Patent, is—

In a car-starter, the fast and loose clutching-hubs D D' on the axle C, in combination with the levers E F, connection b, and a longitudinally-movable draw-head, G', substantially as described.

In testimony that I claim the above I have hereunto subscribed my name in the presence of two witnesses.

JAMES B. SCHOFIELD.

Witnesses:
IRVIN BELFORD,
W. B. TETERS.